US008535478B2

(12) United States Patent
Pouchelon et al.

(10) Patent No.: US 8,535,478 B2
(45) Date of Patent: Sep. 17, 2013

(54) ADHESIVE SILICONE ELASTOMER COMPOSITION

(75) Inventors: Alain Pouchelon, Meyzieu (FR); Francis Lafaysse, Lyons (FR)

(73) Assignee: Bluestar Silicones France SAS, Lyons (FR)

( * ) Notice: Subject to any disclaimer, the term of this patent is extended or adjusted under 35 U.S.C. 154(b) by 549 days.

(21) Appl. No.: 12/670,868

(22) PCT Filed: Jul. 30, 2008

(86) PCT No.: PCT/EP2008/059989
§ 371 (c)(1),
(2), (4) Date: Jun. 17, 2010

(87) PCT Pub. No.: WO2009/016199
PCT Pub. Date: Feb. 5, 2009

(65) Prior Publication Data
US 2010/0282410 A1    Nov. 11, 2010

(30) Foreign Application Priority Data

Aug. 2, 2007 (FR) .................................... 07 05659

(51) Int. Cl.
| | |
|---|---|
| *C09J 143/04* | (2006.01) |
| *C08L 83/04* | (2006.01) |
| *C08K 3/26* | (2006.01) |
| *C08K 3/22* | (2006.01) |
| *C08K 3/34* | (2006.01) |
| *C08K 3/30* | (2006.01) |

(52) U.S. Cl.
USPC ........... 156/329; 524/423; 524/425; 524/430; 524/431; 524/432; 524/442; 524/449; 524/451; 524/493; 524/588

(58) Field of Classification Search
None
See application file for complete search history.

(56) References Cited

U.S. PATENT DOCUMENTS

| 4,780,260 | A | * | 10/1988 | Yoshida et al. ............... 264/255 |
|---|---|---|---|---|
| 4,889,576 | A | * | 12/1989 | Suganuma et al. ........... 156/249 |
| 4,978,696 | A | * | 12/1990 | Clark et al. ................... 523/212 |
| 5,164,461 | A | | 11/1992 | Mitchell et al. |
| 5,438,094 | A | * | 8/1995 | Fujiki et al. .................. 524/730 |
| 5,536,803 | A | | 7/1996 | Fujiki et al. |
| 5,700,532 | A | * | 12/1997 | Chiou ........................... 428/36.1 |
| 6,369,185 | B1 | | 4/2002 | Amako et al. |
| 6,425,600 | B1 | * | 7/2002 | Fujiki et al. ................. 280/728.1 |
| 6,645,638 | B2 | | 11/2003 | Fujiki et al. |
| 6,734,250 | B2 | | 5/2004 | Azechi et al. |
| 6,740,405 | B2 | * | 5/2004 | Shudo ........................... 428/391 |
| 6,811,650 | B2 | * | 11/2004 | Takuman et al. ............. 156/329 |
| 6,887,932 | B2 | * | 5/2005 | Azechi ........................... 524/492 |
| 2003/0211340 | A1 | | 11/2003 | Ikeno et al. |
| 2004/0157064 | A1 | | 8/2004 | Aoki |
| 2005/0042462 | A1 | | 2/2005 | Fehn et al. |
| 2005/0165194 | A1 | | 7/2005 | Benayoun et al. |
| 2005/0234181 | A1 | | 10/2005 | Ikeno et al. |
| 2006/0189777 | A1 | | 8/2006 | Aoki |
| 2007/0078337 | A1 | | 4/2007 | Vockler et al. |
| 2007/0261790 | A1 | | 11/2007 | Pouchelon et al. |
| 2009/0001690 | A1 | * | 1/2009 | Ikeno et al. ................. 280/728.1 |

FOREIGN PATENT DOCUMENTS

| CA | 2101708 A1 | 1/1994 |
|---|---|---|
| EP | 0 537 784 B1 | 3/1995 |
| EP | 0 607 683 B1 | 11/1998 |
| JP | 02-073878 A | 3/1990 |
| JP | 2007-106905 A | 4/2007 |
| JP | 2008-013713 A | 1/2008 |

OTHER PUBLICATIONS

Gelest, Reactive Silicones: Forging new polymer links, 2004, 64 pages.*
French Search Report dated Mar. 14, 2008 of Corresponding Application No. FR 07 05659.
International Search Report dated Sep. 17, 2009 of PCT/EP2008/059989.
XP 55010096 F. de Buyl "Silicone Sealants and Structural Adhesives", International Journal of Adhesion & Adhesives, vol. 21, No. 5, Jan. 1, 2001.
XP007918236 "Silicones", Encyclopedia of Polymer Science and Technology, 2003, p. 764-841.

* cited by examiner

*Primary Examiner* — Robert S Loewe
(74) *Attorney, Agent, or Firm* — Pearne & Gordon LLP

(57) ABSTRACT

The present invention relates to a high-performance silicone elastomer composition that is adhesive and that can be crosslinked at high temperature for the assembly of silicone-based substrates, both by platinum and peroxide catalysis, and that may lend itself to a strip conformation. The composition comprises at least one gum, one catalyst and one adhesion promoter of polyorganohydrogensiloxane type, the nature and the amount of said adhesion promoter having been chosen so that Si—H groups are in excess following the reaction for crosslinking the composition, so as to obtain a potential surface density of covalent Si— bonds with the silicone substrate to be bonded of at least one covalent Si— bond per 60 nm$^2$.

10 Claims, No Drawings

ADHESIVE SILICONE ELASTOMER COMPOSITION

The general field of the invention is that of silicone elastomer compositions crosslinkable or vulcanizing under heat by reaction of a polyorganosiloxane which can cross-link by the action of a catalyst based on at least one organic peroxide, or a polyorganosiloxane comprising alkenyl groups with a polyorganohydrogenosiloxane in the presence of a metallic, preferably platinum-based, catalyst.

Such compositions are used for example for bonding silicone substrates based on fibrous materials, in particular flexible supports, such as woven supports or non-woven supports, comprising at least one silicone coating obtained by surface application or by impregnation of at least one of their surfaces, using at least one liquid silicone composition at the time of this operation, which can cross-link into elastomer. Varnishes, in particular silicone varnishes can also be applied to such coatings. In these different cases, silicone complexes are then obtained.

These two-dimensional flexible supports are in particular chosen from textile fabrics optionally coated with a layer of silicone elastomer to which an anti-fouling varnish is optionally applied, such fabrics being capable of being used for the production:

1. of architectural textiles (components of textile architecture);
2. or also of flexible supports other than architectural textiles.

As regards the field of application 1, it should be specified that, throughout the present disclosure and within the meaning of the present invention, by the term "architectural textile" is meant a woven fabric or nonwoven fabric and more generally any fibrous support intended, after coating, for the preparation:

- of shelters, mobile structures, textile constructions, partitions, flexible doors, tarpaulins, tents, stands or marquees;
- of furniture, cladding, advertising displays, windbreaks or filter panels;
- of solar protection devices, ceilings and blinds.

As regards the field of application 2, it will be indicated that these flexible supports other than architectural textiles can, for example, be those intended for the manufacture of, in particular:

- airbags used for the protection of the occupants of a vehicle,
- glass braids (woven glass sheaths for thermal and dielectric protection for electrical wires),
- conveyor belts, fire-break fabrics or thermal insulation fabrics,
- clothes,
- compensators (flexible tight sleeves for piping).

It is often necessary, in particular in the field of textile architecture, to assemble different parts or components of these silicone complexes, in order to strengthen them locally (reinforcements) or to join parts end to end in order to increase the surface area or in order to prepare the final article.

This operation is often done by sewing, which leads to a suitable assembly but which however results in certain drawbacks. In fact, the stitches are so many holes in the silicone complexes, which can impair their sealing properties and their resistance to chemical, thermal and climatic attack. The corresponding final design can also be limited by this.

Another method of proceeding is bonding, in particular using a silicone adhesive. Nevertheless, even though they are mechanically efficient, silicone adhesives often have a liquid or pasty character which causes an irregularity of the joint, which is aesthetically undesirable.

This is why bonding intermediates have been developed, being presented in the form of strips onto which the silicone adhesives have been laminated. The strips are then suitably positioned between the sheets of silicone complexes to be assembled. This method of bonding allows the adhesive joints produced to retain their initial form.

Thus, the patent EP-B-0 219 075 and its corresponding U.S. Pat. No. 4,889,576, show that silicone-coated textiles can be bonded by means of silicone rubber strips such as the elastomers which can vulcanize under heat which are arranged between the two composite parts to be assembled. These are plastic adhesives strips (non-liquid) at ambient temperature (Williams plasticity comprised between 170 and 600, e.g. 280). The vulcanization of the adhesive takes place during a compression-heating phase.

The gum used in the adhesive made of (silicone elastomer vulcanizing under heat) is for example of the $M^{Vi}DD^{Vi}M^{Vi}$ type; with the following definition of the siloxy units, M: $(CH3)_3SiO_{1/2}$, $M^{Vi}$: $(CH3)_2ViSiO_{1/2}$, D: $(CH3)_2SiO_{2/2}$, $D^{Vi}$: $(CH3)ViSiO_{2/2}$, Vi=vinyl. This gum composition also comprises a radical hardening/cross-linking catalyst: 2,4-dichlorobenzoyl-peroxide and a silica filler treated with HexaMethylDisilaZane. This cross-linkable material serves to produce adhesive strips for example by laminating the silicone adhesive onto a peel-off film. The strips are then placed in the overlap zone of the composite parts to be assembled. The assembly is then subjected to pressure (2 kg/5 cm) and heating (180° C.-10 min).

Another solution has been described in the international patent application WO 2007/042712. This document describes an assembly intermediate making it possible to join together two textile sheets each possessing a surface application layer of a silicone-based polymer. This bonding intermediate comprises in a known manner a composition based on a non-cross-linked silicone elastomer. In order to ensure its handling and its protection, the bonding intermediate is also provided with an anti-adhesive film positioned on one of its surfaces. The bonding intermediate is presented in the form of a flat straight section of a strip based on the non-cross-linked silicone elastomer composition. This straight section also comprises a translucent film present on the second surface of the strip, i.e. that opposite the one receiving the anti-adhesive film.

It is however difficult to find adhesives strong enough to reach the required performances.

Taking this prior art into account, one of the essential objectives of the present invention is to provide a novel high-performance silicone elastomer composition, which is adhesive and can cross-link under heat, for assembling fibre/silicone complex parts.

Another objective of the present invention is to provide a novel silicone elastomer composition, which is adhesive and can cross-link under heat, making it possible to ensure an assembly the peeling rupture of which occurs in a cohesive system and with a resistance which guarantees the integrity of the assembly.

Another objective of the present invention is to provide a novel high-performance silicone elastomer composition, which is adhesive and can cross-link under heat, both by platinum and peroxide catalysis.

Another objective of the present invention is to provide a novel silicone elastomer composition, which is adhesive and can cross-link under heat, lending itself to a strip conformation.

These objectives, among others, are achieved by the present invention which relates firstly to a silicone elastomer composition, which is adhesive and can cross-link under heat, intended in particular for bonding a silicone substrate, this composition comprising:

the components (a-1) or (a-2):
(a-1) corresponding to at least one polyorganosiloxane gum (I), optionally having per molecule at least two alkenyl groups, preferably $C_2$-$C_6$, bound to the silicon, which can cross-link by the action of a catalyst based on at least one organic peroxide, and
(a-2) corresponding to a mixture of polyorganosiloxanes which can cross-link by polyaddition reactions comprising:
at least one polyorganosiloxane gum (I') having, per molecule, at least two alkenyl groups, preferably $C_2$-$C_6$— bound to the silicon (and
at least one polyorganosiloxane (II) having, per molecule, at least two hydrogen atoms bound to the silicon,
a reinforcing mineral filler (III),
an effective quantity of cross-linking catalyst comprising: when (a-1) is utilized with at least one organic peroxide (IV) and when (a-2) is utilized with at least one metal or metallic compound of the platinum group (V),
an adhesion promoter of polyorganohydrogenosiloxane type comprising Si—H groups (VI),
optionally at least one additional adhesion promoter (VII)
optionally at least one additional filler (VIII),
optionally at least one cross-linking inhibitor (IX),
optionally at least one polyorganosiloxane resin (X), and
optionally one or more functional additives for conferring specific properties;
characterized in that, on the one hand, the nature and, on the other hand, the quantity of said adhesion promoter of polyorganohydrogenosiloxane type (VI) are chosen so that Si—H groups are in excess following the reaction for cross-linking the composition, in order to obtain a potential surface density of Si— covalent bonds with the silicone substrate to be bonded of at least one Si— covalent bond per 60 nm², preferably at least one Si— covalent bond per 40 nm².

The potential surface density of Si— covalent bonds with the silicone substrate to be bonded is defined by the surface area in nm² necessary in order to obtain at least one Si— covalent bond in the extreme surface layer of the material considered, calculated as a function of the nature and quantity of the polyorganohydrogenosiloxane (VI) and of the optionally alkenylated polyorganosiloxane gum (I) or (I'), and optionally of the polyorganosiloxane (II). In the case of the silicones, the monomolecular layer is 0.75 nm thick.

Preferably, on the one hand, the nature and, on the other hand, the quantity of said adhesion promoter of polyorganohydrogenosiloxane type (VI) are chosen so that the excess of Si—H groups following the reaction for cross-linking with the alkenyl groups of the polyorganosiloxane gum (I or I') is at least 0.1% by weight of SiH (mass 29) relative to the SiH:Si-alkenyl ratio equal to 1:1, per 100 g of said silicone composition, preferably at least 0.15% of SiH per 100 g of said silicone composition, the polyorganosiloxane gum (I) then having per molecule at least two alkenyl groups preferably $C_2$-$C_6$ bound to the silicon. It is to the credit of the inventors to have developed a composition used in order to formulate very high-performance silicone elastomer adhesives, in particular for assembling silicone complexes intended in particular for textile architecture, both by platinum and peroxide catalysis, by providing an excess of SiH groups following the cross-linking reaction which is much greater than the excess of SiH groups used up until now in known compositions.

In the present disclosure, reference is made to the following "silicone" nomenclature in order to represent the siloxy units ("*Chemistry and technology of silicones*" Walter NOLL *Academic Press* 1968 *Table* 1 *page* 3"):

M: $(R°)_3SiO_{1/2}$,
$M^{Alk}$: $(R°)_2(Alk)SiO_{1/2}$,
D: $(R°)_2SiO_{2/2}$,
$D^{Alk}$: $(R°)(Alk)SiO_{2/2}$,
M': $(R°)_2(H)SiO_{1/2}$,
D': $(R°)(H)SiO_{2/2}$,
$M^{OH}$: $(R°)_2(OH)SiO_{1/2}$,
$D^{OH}$: $(R°)(OH)SiO_{2/2}$,
T: $(R°)SiO_{3/2}$,
Q: $SiO_{4/2}$, where R° is chosen from the linear or branched alkyl groups having 1 to 8 carbon atoms inclusive (e.g. methyl, ethyl, isopropyl, tert-butyl and n-hexyl), optionally substituted by at least one halogen atom (e.g. trifluoro-3,3,3 propyl), as well as from the aryl groups (e.g. phenyl, xylyl and tolyl), Alk=alkenyl, preferably vinyl (denoted Vi), or allyl.

According to a first variant, the silicone composition is a composition which can cross-link by peroxide catalysis.

In this case, the polyorganosiloxane gum (I) which can cross-link by the action of a catalyst based on at least one organic peroxide is advantageously a product having siloxyl units of formulae:

$$R^1_a SiO_{(4-a)/2} \qquad (I.1)$$

in which:
$R^1$ represents a hydrocarbon group having 1 to 12 carbon atoms, preferably 1 to 8 carbon atoms, optionally substituted, and
a is 1, 2 or 3.

Preferably, $R^1$ is chosen from:
the methyl, ethyl, propyl, butyl, hexyl and dodecyl groups,
the cycloalkyl groups such as for example cyclohexyl,
the alkenyl groups such as for example the vinyl, allyl, butenyl and hexenyl groups,
the aryl groups such as for example the phenyl, tolyl, aralkyl groups such as β-phenylprolyl, and
the above-mentioned groups in which one or more hydrogen atoms are replaced by one or more halogen atoms, a cyano group or equivalent of a cyano group such as for example a chloromethyl, trifluoropropyl or cyanoethyl.

Still more preferentially, the polyorganosiloxanes (I) are terminated at their chain end by trimethylsilyl, dimethylvinyl, dimethylhydroxysilyl, trivinylsilyl units.

In a particularly advantageous embodiment, the polyorganosiloxanes (I) contain per molecule at least two alkenyl groups, preferably $C_2$-$C_6$, bound to the silicon. In this case, the polyorganosiloxane gum (I) corresponds to the same definition as the polyorganosiloxane gum (I') used in a platinum catalysis and as described hereafter.

The gum (I) has a very high molecular weight, for example comprised between 300,000 and 800,000, preferably comprised between 400,000 and 600,000.

Advantageously, the gum (I) has an average alkenyl, preferably vinyl, group content comprised between 0 and 2,000 ppm, and preferably comprised between 200 and 1,000 ppm.

Of course, the gum (I) can be a mixture of several gums corresponding to the same definition as the gum (I).

Examples of gums (I) are gums for which the dimethylpolysiloxane main chain, or the main chain of a dimethylsiloxane-methylphenylsiloxane, or dimethylsiloxane-diphenylsiloxane, or dimethylsiloxane-methylvinylsiloxane copolymer, is terminated by trimethylsiloxy, dimethylvinylsiloxy, methylphenylvinylsiloxy or silanol groups.

Among the organic peroxides (IV) which are useful according to the invention there may be mentioned benzoyl peroxide, bis(p-chlorobenzoyl) peroxide, bis(2,4-dichlorobenzoyl) peroxide, dicumyl peroxide, di-t-butyl peroxide, 2,5-dimethyl-2,5-di(t-butylperoxy)hexane, t-butyl-perbenzoate, t-butylcumyl peroxide, the halogenated derivatives of the above-mentioned peroxides such as for example bis(2,4-dichlorobenzoyl) peroxide, 1,6-bis(p-toluoylperoxycarbonyloxy)hexane, 1,6-bis(benzoylperoxy-carbonyloxy)hexane, 1,6-bis(p-toluoylperoxycarbonyloxy)butane and 1,6-bis(2,4-dimethylbenzoylp eroxycarbonyloxy)hexane.

This first peroxide catalysis variant is preferred as it allows better preservation of the elastomer and is less expensive.

According to a second variant, the silicone composition is a composition which can cross-link by metallic, preferably platinum-based catalysis.

In this case, the polyorganosiloxane gum (I') has units of formula:

$$W_a Z_b SiO_{(4-(a+b))/2} \quad (I'.1)$$

in which:
W is an alkenyl, preferably vinyl group,
Z is a monovalent hydrocarbon group, with no unfavourable effect on the activity of the catalyst and chosen from the alkyl groups having 1 to 8 carbon atoms inclusive, optionally substituted by at least one halogen atom, as well as from the aryl groups,
a is 1 or 2, b is 0, 1 or 2 and a+b is comprised between 1 and 3; and optionally other units of average formula:

$$Z''_c SiO_{(4-c)/2} \quad (I'.2)$$

in which Z'' has the same meaning as above and c'' has a value comprised between 0 and 3.

The polyorganosiloxane gum (I), when it comprises alkenyl groups, then corresponds to a polyorganosiloxane gum (I').

The Z groups can be identical or different.

By "alkenyl", is meant a substituted or unsubstituted, linear or branched, unsaturated hydrocarbon chain, having at least one olefin double bond, and more preferably a single double bond. Preferably, the "alkenyl" group has 2 to 8 carbon atoms, better still 2 to 6. This hydrocarbon chain optionally comprises at least one heteroatom such as O, N, S.

Preferred examples of "alkenyl" groups are vinyl, allyl and homoallyl groups; vinyl being particularly preferred.

By "alkyl", is meant a linear or branched, cyclic, saturated hydrocarbon chain, optionally substituted (e.g. by one or more alkyls), preferably with 1 to 10 carbon atoms, for example with 1 to 8 carbon atoms, even better with 1 to 4 carbon atoms.

Examples of alkyl groups are in particular methyl, ethyl, isopropyl, n-propyl, tert-butyl, isobutyl, n-butyl, n-pentyl, isoamyl and 1,1-dimethylpropyl.

The expression "aryl" designates an aromatic hydrocarbon group, having 6 to 18 carbon atoms, which is monocyclic or polycyclic and preferably monocyclic or bicyclic. It must be understood that, within the framework of the invention, by polycyclic aromatic radical, is meant a radical having two or more aromatic nuclei, condensed (orthocondensed or ortho and pericondensed) with each other, i.e. having, two-by-two, at least two carbon atoms in common.

As an example of "aryl", there can be mentioned e.g. the phenyl, xylyl and tolyl radicals.

The gum (I') has a very high molecular weight, for example comprised between 300,000 and 800,000, preferably comprised between 400,000 and 600,000. Advantageously, the gum (I') has an average alkenyl, preferably vinyl, group content comprised between 100 and 2,000 ppm, and preferably comprised between 200 and 1,000 ppm.

Of course, the gum (I') can be a mixture of several gums corresponding to the same definition as the gum (I').

The gum (I') can be formed solely of units of formula (I'.1) or can also contain units of formula (I'.2).

The gum (I') is advantageously a linear polymer, the diorganopolysiloxane chain of which is essentially constituted by siloxy units D or $D^{Vi}$, and is blocked at each end by a siloxy unit M or $M^{Vi}$.

Preferably, at least 60% of the Z groups represent methyl radicals. The presence, along the diorganopolysiloxane chain, of small quantities of units other than $Z_2SiO$, for example units of formula $ZSiO_{1.5}$ (T siloxy units) and/or $SiO_2$ (Q siloxy units) is not however excluded in the proportion of at the most 2% (these percentages expressing the number of T and/or Q units per 100 atoms of silicon).

Examples of siloxyl units of formula (I'.1) are vinyldimethylsiloxyl, vinylphenylmethylsiloxyl, vinylmethylsiloxyl and vinylsiloxyl units.

Examples of siloxyl units of formula (I'.2) are the $SiO_{4/2}$ unit, dimethylsiloxyl, methylphenylsiloxyl, diphenylsiloxyl, methylsiloxyl and phenylsiloxyl.

Examples of gums (I') are the dimethylpolysiloxane gums with dimethylvinylsiloxy or dimethylallylsiloxy ends, the diphenylsiloxane-dimethylsiloxane copolymers with phenylmethylvinylsiloxy ends, the methylvinylsiloxane-dimethylsiloxane copolymers with dimethylvinylsiloxy or silanol ends.

These gums (I) or (I') are marketed by silicone manufacturers or can be produced using techniques which are already known.

The polyorganosiloxane (II) is preferably of the type of those comprising the siloxyl unit of formula:

$$H_d L_e SiO_{(4-(d+e))/2} \quad (II.1)$$

in which:
L is a monovalent hydrocarbon group with no unfavourable effect on the activity of the catalyst and chosen from the alkyl groups having 1 to 8 carbon atoms inclusive, optionally substituted by at least one halogen atom as well as from the aryl groups,
d is 1 or 2, e is 0, 1 or 2 and d+e has a value comprised between 1 and 3; and optionally other siloxyl units of average formula:

$$L_g SiO_{(4-g)/2} \quad (II.2)$$

in which L has the same meaning as above and g has a value comprised between 0 and 3. The dynamic viscosity of this polyorganosiloxane (II) is at least equal to 5 mPa·s and it is preferably comprised between 5 and 100 mPa·s, and even more preferentially between 10 and 40 mPa·s.

In the present disclosure, the viscosities indicated correspond to a dynamic viscosity value measured at 25° C., using a BROOKFIELD viscometer, according to the AFNOR NFT 76 106 standard of May 1982.

The polyorganosiloxane (II) can be formed solely of units of formula (II.1) or additionally comprise units of formula (II.2).

The polyorganosiloxane (II) can have a linear, branched, cyclic or network structure.

The L group has the same meaning as the Z group above. Examples of siloxyl units of formula (II.1) are

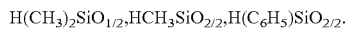

The examples of siloxyl units of formula (II.2) are the same as those given above for the examples of siloxyl units of formula (I'.2).

Examples of polyorganosiloxanes (II) are linear and cyclic compounds such as
the dimethylpolysiloxanes with hydrogenodimethylsilyl ends,
the copolymers with (dimethyl)-(hydrogenomethyl)-polysiloxane units with trimethylsilyl ends,
the copolymers with (dimethyl)-(hydrogenomethyl)-polysiloxane units with hydrogenodimethylsilyl ends,
the hydrogenomethylpolysiloxanes with trimethylsilyl ends,
the cyclic hydrogenomethylpolysiloxanes.

The compound (II) can optionally be a mixture of a dimethylpolysiloxane with hydrogen dimethylsilyl ends and a polyorganosiloxane bearing at least 3 SiH (hydrogenosiloxyl) functions.

The adhesion promoter of polyorganohydrogenosiloxane type comprising Si—H groups (VI) corresponds to the same definition as that described above for the polyorganosiloxane (II), the conditions specific to the adhesion promoter (VI) as defined above also applying. In particular, the adhesion promoter (VI) must be sufficiently rich in Si—H to correspond to the claimed characteristics of the composition of the present invention. For example, the adhesion promoter (VI) cannot be a copolymer of statistical character, in which the hydrogen atoms are too far away from each other.

Advantageously, it is possible to use, in the case of platinum-based catalysis, a single polyorganohydrogenosiloxane in a sufficient quantity to act as both cross-linking agent (II) and adhesion promoter (VI), in order to correspond to the characteristics of the present invention.

Preferably, the adhesion promoter (VI) is polymethylhydrogenosiloxane, with trimethylsilyl ends or with hydrogen dimethylsilyl ends. Preferably, this polymethylhydrogenosiloxane has a viscosity comprised between 5 and 100 mPa·s, even more preferentially comprised between 10 and 40 mPa·s. Its SiH groups content is preferably comprised between 10 and 45% by weight. In the case of platinum-based catalysis, this polymethylhydrogenosiloxane is used both as cross-linking POS (II) and as adhesion promoter (VI).

The adhesion promoter (VI) can also be a methylhydrogenosiloxane and dimethylsiloxane copolymer, with trimethylsilyl ends or with hydrogen dimethylsilyl ends.

This copolymer has a viscosity comprised between 10 and 500 mPa·s, preferably between 10 and 100 mPa·s and even more preferentially between 10 and 40 mPa·s; Its SiH groups content is preferably comprised between 10 and 48% by weight. In the case of platinum-based catalysis, this copolymer is used both as cross-linking POS (II) and as adhesion promoter (VI).

The proportions of polyorganohydrogenosiloxane (VI), of the optionally alkenylated polyorganosiloxane gum (I) or (I'), and optionally of the polyorganosiloxane (II) are such that Si—H groups (originating from the polyorganohydrogenosiloxane (VI) and optionally from the polyorganosiloxane (II) and optionally from the additional adhesion promoter (VII)) are in excess following the reaction for cross-linking the composition, in order to obtain a potential surface density of Si— covalent bonds with the silicone substrate to be bonded of at least one Si— covalent bond per 60 nm$^2$, preferably at least one Si—covalent bond per 40 nm$^2$.

More specifically, the proportions of polyorganohydrogenosiloxane (VI), of the optionally alkenylated polyorganosiloxane gum (I) or (I'), and optionally of the polyorganosiloxane (II) are such that the excess of Si—H groups (originating from the polyorganohydrogenosiloxane (VI) and optionally from the polyorganosiloxane (II) and optionally from the additional adhesion promoter (VII)) following the reaction for cross-linking with the alkenyl groups of the polyorganosiloxane gum (I or I') is at least 0.1% by weight of SiH relative to the SiH:Si-alkenyl ratio equal to 1:1, per 100 g of said silicone composition, preferably at least 0.15% of SiH per 100 g of said silicone composition, the polyorganosiloxane gum (I) then having per molecule at least two alkenyl groups, preferably $C_2$-$C_6$, bound to the silicon.

By way of comparison, a standard polyaddition HCR product, which is general formulated according to an SiH/SiVi ratio equal to 1.5, and which contains approximately 500 ppm of vinyl groups, then has an excess of 250 ppm of SiH groups, which as a result represents an excess of 0.025% by weight of SiH.

The polyaddition reaction specific to the cross-linking mechanism of the composition of the invention is well known to a person skilled in the art. A catalyst (V) can also be used in this reaction. This catalyst (V) can in particular be chosen from the platinum and rhodium compounds. The complexes of platinum and an organic product described in the U.S. Pat. Nos. 3,159,601, 3,159,602, 3,220,972 and the European patents EP-A-0 057 459, EP-A-0 188 978 and EP-A-0 190 530, the platinum and vinylated organosiloxane complexes described in the U.S. Pat. Nos. 3,419,593, 3,715,334, 3,377, 432 and 3,814,730 can in particular be used. The generally preferred catalyst is platinum. In this case, the quantity by weight of catalyst (V), calculated by the weight of platinum metal, is generally comprised between 2 and 400 ppm, preferably between 5 and 100 ppm based on the total weight of the POS (I') and (II)).

The reinforcing mineral filler (III) is selected from the silicas and/or the aluminas Preferably, the reinforcing mineral filler (III) is selected from the silicas with a specific surface area comprised between 100 and 300 m$^2$/g, these silicas being optionally pretreated using at least one compatibility agent.

These silicas can be colloidal silicas, silicas prepared pyrogenically (so-called combustion or fumed silicas) or by wet processes (precipitated silicas) or mixtures of these silicas. The silicas of this type are commercially available products and are well known in the production technique for silicone elastomers.

The chemical nature and the process for the preparation of the silicas capable of forming the filler (III) are not significant for the purposes of the present invention, provided that the silica is capable of exerting a reinforcing action in the finished adhesive elastomer. Of course it is possible to also use blends of different silicas.

These silica powders have an average particle size generally close to or less than 0.1 μm and a BET specific surface area greater than 50 m$^2$/g, preferably comprised between 100 and 300 m$^2$/g.

These silicas are optionally:
pretreated using at least one compatibility agent chosen from the group of molecules which meet at least two criteria:
exhibiting a strong interaction with the silica at the level of its hydrogen bonds with itself, and with the surrounding silicone gum;
itself being, or its degradation products being, easily removed from the final mixture by heating under vacuum or under a stream of gas, and the compounds of low molecular weight are therefore preferred;

and/or treated in situ:

specifically using at least one untreated silica, and/or additionally using at least one compatibility agent similar in nature to that which can be used in pretreatment and as defined above.

The compatibility agent is chosen according to the method of treatment (pretreatment or in situ), it can be for example selected from the group comprising:

the chlorosilanes, the polyorganocyclosiloxanes, such as octamethylcyclosiloxane (D4), the silazanes, preferably the disilazanes, or mixtures thereof, hexamethyldisilazane (HMDZ) being the preferred silazane which can be combined with divinyltetramethyl-disilazane, the polyorganosiloxanes having, per molecule, one or more hydroxyl groups bound to the silicon, the amines such as ammonia or the alkylamines of low molecular weight such as diethylamine, organic acids of low molecular weight such as formic or acetic acids, and mixtures thereof.

In the case of the treatment in situ, the compatibility agent is preferably utilized in the presence of water.

For more details in this connection, reference can be made for example to the patent FR 2 764 894. As a variant, it is possible to use the compatibility methods of the prior art providing an early treatment with silazane (e.g. FR 2 320 324) or a late treatment (e.g. EP 462 032).

As reinforcing alumina which can be used as filler (III), a highly dispersible alumina, doped or not doped in known manner is advantageously used. Of course, it is also possible to use blends of different aluminas As non-limiting examples of similar aluminas, there may be mentioned the aluminas A 125, CR 125, D 65CR from BAIKOWSKI.

Very fine kaolins can also be used as reinforcing fillers, either alone or in combination with another reinforcing filler.

With regard to weight, it is preferred to utilize a quantity of reinforcing filler (III) comprised between 5 and 30, preferably between 7 and 20% by weight relative to all of the constituents of the composition.

The use of an additional filler (VIII), preferably non-reinforcing, can be envisaged according to the present invention Among the non-reinforcing additional fillers (VIII), there may be mentioned in particular those selected from the group comprising the colloidal silicas, the combustion and precipitation silica powders, diatomaceous earths, ground quartz, carbon black, titanium dioxide, aluminium oxide, hydrated alumina, expanded vermiculite, zirconia, a zirconate, non-expanded vermiculite, calcium carbonate, zinc oxide, mica, talc, iron oxide, barium sulphate, slaked lime, and mixtures thereof.

These fillers (VIII) have a particle size generally comprised between 0.1 and 300 μm and a BET specific surface area of less than 100 m²/g.

The additional adhesion promoter (VII) can for example comprise:

(VII.1) at least one alkoxylated organosilane corresponding to the following general formula:

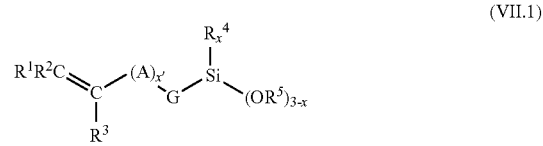

(VII.1)

in which:

—$R^1$, $R^2$, $R^3$ are hydrogen or hydrocarbon radicals which are identical to or different from each other and represent, preferably, hydrogen, a linear or branched $C_1$-$C_4$ alkyl or a phenyl optionally substituted by at least one $C_1$-$C_3$ alkyl, A is a linear or branched $C_1$-$C_4$ alkylene;

G is a valency bond or oxygen, $R^4$ and $R^5$ are identical or different radicals and represent a linear or branched $C_1$-$C_4$ alkyl radical;

x'=0 or 1, and x=0 to 2, said compound (VII.1) preferably being vinyltrimethoxysilane (VTMS);

(VII.2) at least one organosilic compound comprising at least one epoxy radical, said compound (VII.2) preferably being 3-glycidoxypropyltrimethoxysilane (GLYMO);

(VII.3) at least one chelate of metal M and/or a metallic alkoxide of general formula: M (OA, with n=valency of M and J=linear or branched $C_1$-$C_8$ alkyl, M being chosen from the group formed by: Ti, Zr, Ge, Li, Mn, Fe, Al, Mg, said compound (VII.3) preferably being tert.butyl titanate.

As regards quantity, it can be specified that the weight proportions between (VII.1), (VII.2) and (VII.3), expressed in percentages by weight relative to the total of the three, are as follows:

(VII.1)>10%, (VII.2)>10%, (VII.3)<80%, it being understood that the sum of these proportions in (VII.1), (VII.2), (VII.3) is equal to 100%.

Advantageously, the additional adhesion promoter (VII) is present at a level of 0.1 to 10%, preferably 0.5 to 5% and even more preferentially 1 to 2.5% by weight relative to all of the constituents of the composition.

This additional adhesion promoter (VII) can make it possible to reach the claimed density of Si— bonds by combining its Si— bonds potential with that of the adhesion promoter (VI).

The cross-linking inhibitors (IX) are also well known. They are conventionally chosen from the following compounds:

polyorganosiloxanes, advantageously cyclic and substituted by at least one alkenyl, tetramethylvinyltetrasiloxane being particularly preferred, pyridine, phosphines and organic phosphites, unsaturated amides, alkylated maleates, and acetylenic alcohols.

These acetylenic alcohols, (cf. FR-B-1 528 464 and FR-A-2 372 874), which are among the preferred thermal blockers of the hydrosilylation reaction, have the formula:

a formula in which:
R is a linear or branched alkyl radical, or a phenyl radical;
R' is H or a linear or branched alkyl radical, or a phenyl radical;
the R, R' radicals and the carbon atom situated in alpha position of the triple bond optionally being able to form a ring;
the total number of carbon atoms contained in R and R' being at least 5, preferably 9 to 20.

Said alcohols are, preferably, chosen from those having a boiling point above 250° C. There may be mentioned as examples:
ethynyl-1-cyclohexanol 1;
methyl-3 dodecyne-1 ol-3;
trimethyl-3,7,11 dodecyne-1 ol-3;
diphenyl-1,1 propyne-2 ol-1;
ethyl-3 ethyl-6 nonyne-1 ol-3;
methyl-3 pentadecyne-1 ol-3.

These alpha-acetylenic alcohols are commercial products. Such an inhibitor (VI) is present at a level of 3,000 ppm maximum, preferably at a level of 100 to 1,000 ppm relative to the total weight of the organopolysiloxanes (I') and (II).

According to a variant of the invention, the composition comprises no polyorganosiloxane resin.

According to another variant, the silicone phase of the composition can comprise at least one polyorganosiloxane resin (X), optionally comprising at least one alkenyl radical in its structure, and this resin has a weight content of alkenyl group(s) comprised between 0.1 and 20% by weight and, preferably, between 0.2 and 10% by weight.

These resins are well-known branched organopolysiloxane oligomers or polymers which are commercially available. They are preferably presented in the form of siloxane solutions. They comprise, in their structure, at least two different units chosen from the M, D, T and Q units, at least one of these units being a T or Q unit.

Preferably, these resins are alkenylated (vinylated). As examples of branched organopolysiloxane oligomers or polymers, there may be mentioned the MQ resins, the MDQ resins, the TD resins and the MDT resins, the alkenyl functions being able to be borne by the M, D and/or T units. As examples of resins which are particularly suitable, there may be mentioned the vinylated MDQ or MQ resins having a content by weight of vinyl groups comprised between 0.2 and 10% by weight, these vinyl groups being borne by the M and/or D units.

This structural resin is advantageously present in a concentration comprised between 10 and 70% by weight relative to all of the constituents of the composition, preferably between 30 and 60% by weight and, even more preferentially, between 40 and 60% by weight.

The silicone composition obtained has a Mooney consistency (standard NF T 43005, Mooney Broad measurement (1+4), using a Mooney viscometer) comprised between 15 and 75, and preferably comprised between 20 and 45. This consistency means that the composition according to the invention does not flow spontaneously during its storage and does not change significantly during the period of time corresponding to its shelf life. The composition according to the invention lends itself particularly well to a calibrated strip conformation, favourable to the positioning of the adhesive joints to be produced.

The present invention also relates to an adhesive which can be used for silicone membranes, in particular in the field of textile architecture, and comprising the composition as described above.

This adhesive is particularly intended for bonding siliconized textile pieces, reinforced or not reinforced.

The present invention also relates to an adhesive strip which can be used in particular in the field of two-dimensional silicone complexes comprising the adhesive prepared from the composition described above, said adhesive having been laminated.

The present invention also relates to a process for bonding a silicone substrate, comprising the utilization of a composition, or an adhesive or an adhesive strip as described above.

The adhesive strip is put into place in the joining area between two silicone complexes to be assembled. Then the application of a pressure and a high temperature causes the cross-linking of the composition and allows attachment to the silicone contained in each of the two facing layers of two silicone complexes.

The silicone substrate to be bonded is for example a reinforced or non-reinforced silicone membrane of a woven, braided, knitted or nonwoven fibrous support and, preferably a woven, knitted or nonwoven support, made of fibres chosen from the group of materials comprising glass, silica, metals, ceramic, silicon carbide, carbon, boron, basalt, natural fibres such as cotton, wool, hemp, linen, artificial fibres such as viscose, or cellulose fibres, synthetic fibres such as polyesters, polyamides, polyacrylics, chlorofibres, polyolefins, synthetic rubbers, polyvinyl alcohol, aramides, fluorofibres, phenolics.

The composition of the silicone membrane is not of prime importance but it can be advantageously selected from two-component materials which can vulcanize under heat such as RTV-2 or LSR, it then comprises:
(1) at least one polyorganosiloxane having, per molecule, at least two $C_2$-$C_6$ alkenyl groups, bound to the silicon,
(2) at least one polyorganosiloxane having, per molecule, at least two hydrogen atoms bound to the silicon,
(3) a catalytically effective quantity of at least one catalyst, composed of at least one metal belonging to the platinum group,
(4) a ternary adhesion promoter consisting of:
  (4.1.) at least one alkoxyl organosilane containing, per molecule, at least one $C_3$-$C_6$ alkenyl group,
  (4.2.) at least one organosilic compound comprising at least one epoxy radical,
  (4.3) at least one chelate of metal M and/or an metallic alkoxide of general formula: M (OJ)n, with n=valency of M and J=linear or branched $C_1$-$C_8$ alkyl,
M being chosen from the group formed by: Ti, Zr, Ge, Li, Mn, Fe, Al and Mg,
(5) a reinforcing siliceous filler treated in situ with a compatibility agent in the presence of polyorganosiloxane (1),
(6), a polyorganosiloxane called an extender and having terminal siloxyl units with hydrogen functions,
(7) optionally a neutralizing agent,
(8) optionally a cross-linking inhibitor and/or other additive(s) for use in this type of composition
(9) and optionally expanded or expandable, inorganic, hollow microspherical fillers.

As regards the varnishes which can be applied to the silicone membranes, these can be silicone varnishes, for example those which can be cationally and/or radically cross-linked such as those described in the Patent Application WO 00/59992, or silane varnishes essentially based on mixtures of unsaturated silanes.

Another aspect of the invention relates to the use of a polyorganohydrogenosiloxane as an adhesion promoter in a silicone elastomer composition, which is adhesive and can cross-link under heat, intended in particular for bonding a silicone substrate characterized in that, on the one hand, the nature and, on the other hand, the quantity of said polyorganohydrogensiloxane are chosen so that Si—H groups are in excess following the reaction for cross-linking the composition in order to obtain a potential surface density of bonds with the substrate to be bonded of at least one bond per 60 $nm^2$, preferably at least one bond per 40 $nm^2$.

Preferably, the composition and the polyorganohydrogenosiloxane are as defined above.

The following examples of the preparation of compositions and of their application as adhesive strips according to the invention, make it possible to better understand the invention and demonstrate its advantages.

EXAMPLES

Preparation of the Adhesives

Different adhesives were prepared using the following masterbatches (corresponding to the gum (I or I') and to the pretreated filler (III)):
Rhodorsil® MF 135U
Rhodorsil® MF 240U
Rhodorsil® MF 345U
Rhodorsil® MF 940U All these masterbatches are marketed by Bluestar Silicones.

According to the cases defined in Table I below, these masterbatches were combined with:
a polymethylhydrogenosiloxane with a viscosity of 20 mPa·s
a Karstedt platinum catalyst which provides approximately 4 ppm of platinum combined with a cross-linking inhibitor, trimethyldodecynol, at a rate of approximately 1000 ppm
2,5 ditert-butyl 2,5 hexane peroxide at a level of 0.6%.

The abovementioned concentrations relate to the masterbatch utilized. The mixtures are prepared using a laboratory calender which also ensures the shaping of the catalyzed mixture into strips.

Utilization

The composition of the invention was utilized in the form of laminated adhesive strips for assembling two silicone complexes, each constituted by:

a textile glass fibre web with an areal weight of approximately 250 $g/m^2$
on one surface at least one adhesive silicone surface application (Rhodorsil® TCS 7534 marketed by Bluestar Silicones) applied at a rate of approximately 200 $g/m^2$; this surface application layer being suitably cross-linked in accordance with the manufacturer's recommendations Assembly For the assembly,
silicone adhesive laminates, prepared as above with a thickness of approximately 700 μm, are prepared
these laminates are arranged between the complexes to be bonded,
the adhesive is cross-linked at temperature—2 minutes at 180° C. for example—and under pressure in order to leave an adhesive joint with a thickness of the order of 500 nm.

Measurement of the Peel Force

Test pieces with a width of 5 cm are cut out and subjected to geometric stress known as "peel stress", peeling at 180° in a dynamometer the upper jaw of which is moved at 50 mm/min. The peel force in the regular regime is recorded and the type of rupture—cohesive or adhesive—is characterized visually; the rupture strength is expressed in N/cm The results are shown in Table I below which comprises:
the reference of the masterbatch used
the type of catalyst added
the potential surface density of Si— covalent bonds (surface area in $nm^2$ in order to obtain at least one Si— covalent bond)
This potential is obtained assuming that the monomolecular layer of the adhesive is 0.75 nm thick, and starting from the quantity of SiH and SiVi groups present in the composition and available for the cross-linking reaction.
the excess of SiH groups with respect to the unsaturations involved
the Mooney consistency of the mixture—standard NF T 43005-, using a Mooney viscometer
a comment regarding the quality of the strip conformation
the peel value according to the test carried out
the type of peeling, cohesive (CR) or adhesive (AR) rupture

TABLE I

| Masterbatch | Catalyst | Density $nm^2$ per 1 bond | Excess SiH % SiH | Mooney Consistency ML 1 + 4 | Strip conformation | Peeling N/cm | Type of peeling |
|---|---|---|---|---|---|---|---|
| MF135U | Pt | 63 | 0.06 | 30 | OK | 4.5 | AR |
| MF135U | Pt | 38 | 0.1 | 30 | OK | 8 | CR |
| MF135U | Pt | 19 | 0.2 | 30 | OK | 10 | CR |
| MF135U | Pt | 13 | 0.3 | 30 | OK | 10 | CR |
| MF135U | peroxide | 16 | 0.25 | 30 | OK | 10 | CR |
| MF240U | Pt | 13 | 0.3 | 20 | creep | 8 | CR |
| MF345U | Pt | 38 | 0.1 | 35 | OK | 8 | AR-CR |
| MF345U | Pt | 19 | 0.2 | 35 | OK | 10 | CR |
| MF345U | peroxide | 19 | 0.2 | 35 | OK | 9 | CR |
| MF360U | Pt | 63 | 0.06 | 50 | difficult | 6 | AR |
| MF940U | Pt | 19 | 0.2 | 30 | OK | 10 | CR |
| MF135U | peroxide | ∞ | 0 | 30 | creep | <1 | AR |

Also by way of comparison, it will be recalled that a standard polyaddition silicon elastomer vulcanizing under heat product, which is generally formulated according to an SiH/SiVi ratio equal to 1.5, and which contains approximately 500 ppm of vinyl groups, then has an excess of 250 ppm of SiH groups, which as a result represents an excess of 0.025% by weight of SiH. Such a product does not make it possible to obtain a satisfactory peel force for the sought application in the form of adhesive strip for assembling two silicone complexes.

The results in Table I show that the composition of the invention can, in practically all cases, be conformed as strips suitable for bonding two silicone complexes.

The composition according to the invention makes it possible to obtain a very high-performance silicone elastomer adhesive, in particular for bonding silicone membranes, both by platinum and peroxide catalysis.

The invention claimed is:

1. A silicone elastomer composition, which is adhesive and crosskinkable under heat, intended in particular to bond a silicone substrate, this composition comprising:
   the components (a-1) corresponding to at least one polyorganosiloxane gum (I), optionally having per molecule at least two alkenyl groups, preferably $C_2$-$C_6$, bound to a silicon atom, which crosslinks by the action of a catalyst based on at least one organic peroxide,
   a reinforcing mineral filler (III),
   an effective quantity of cross-linking catalyst comprising at least one organic peroxide (IV),
   an adhesion promoter of polyorganohydrogensiloxane type comprising Si—H groups (VI),
   optionally at least one additional adhesion promoter (VII)
   optionally at least one additional filler (VIII),
   optionally at least one cross-linking inhibitor (IX),
   optionally at least one polyorganosiloxane resin (X), and
   optionally one or more functional additives for conferring specific properties
wherein the nature and the quantity of said adhesion promoter of polyorganohydrogensiloxane type (VI) are chosen so that the amount of Si—H groups is such that, after the reaction for cross-linking the composition, the potential surface density of Si— covalent bonds with the silicone substrate to be bonded is of at least one Si— covalent bond per 60 nm$^2$, preferably at least one Si— covalent bond per 40 nm$^2$, and wherein said adhesion promotor of polyorganohydrogensiloxane type comprising Si—H groups (VI) is selected from the group consisting of
   the copolymers with (dimethyl)-(hydrogenmethyl)-polysiloxane units with trimethylsilyl ends or with hydrogendimethylsilyl ends,
   the hydrogenmethylpolysiloxanes with trimethylsilyl ends or with hydrogendimethylsilyl ends,
   the cyclic hydrogenmethylpolysiloxanes, and
   wherein the adhesion promoter of polyorganohydrogensiloxane type (VI) is a polymethylhydrogensiloxane having between 10 and 45% by weight Si—H or a methylhydrogensiloxane and dimethylsiloxane copolymer, having between 10 and 48% by weight Si—H.

2. The composition according to claim 1, wherein that the nature and the quantity of said adhesion promoter of polyorganohydrogensiloxane type (VI) are chosen so that, after the reaction for cross-linking the composition, the amount of Si—H groups is at least 0.1% by weight of SiH with respect to the SiH:Si-alkenyl ratio equal to 1:1, per 100 g of said silicone composition, preferably at least 0.15% of SiH per 100 g of said silicone composition, the polyorganosiloxane gum (I) then having per molecule at least two alkenyl groups, preferably $C_2$-$C_6$, bound to the silicon.

3. The composition according to claim 1, wherein the polyorganosiloxane gum (I) has units of formula:

(I.1)

in which:
   W is an alkenyl, preferably vinyl or allyl, group
   Z is a monovalent hydrocarbon group chosen from the alkyl groups having 1 to 8 carbon atoms inclusive, optionally substituted by at least one halogen atom, as well as from the aryl groups,
   a is 1 or 2, b is 0, 1 or 2 and a+b is of between 1 and 3;
   and optionally other units of average formula:

(I.2)

in which Z has the same meaning as above and c has a value of between 0 and 3.

4. The composition according to claim 1, wherein the polyorganosiloxane gum (I) has a molecular weight of between 300,000 and 800,000, and preferably of between 400,000 and 600,000.

5. The composition according to claim 1, wherein the reinforcing mineral filler (III) is selected from silica of specific surface area between 100 and 300 m$^2$/g, the silica being optionally pretreated using at least one compatibility agent.

6. The composition according to claim 1, wherein the additional filler (VIII) is selected from the group consisting of colloidal silica, combustion and precipitation silica powders, diatomaceous earth, ground quartz, carbon black, titanium dioxide, aluminium oxide, hydrated alumina, expanded vermiculite, zirconia, a zirconate, non-expanded vermiculite, calcium carbonate, zinc oxide, mica, talc, iron oxide, barium sulphate, slaked lime, and mixtures thereof.

7. The composition according to claim 1, which has a Mooney consistency (Mooney Broad 1+4), between 15 and 75, and preferably between 20 and 45.

8. An adhesive which can be used for silicone membranes in particular in the field of textile architecture, and which comprises the composition according to claim 1.

9. An adhesive strip, which can be used in particular in the field of two-dimensional silicone complexes, and which comprises the adhesive according to claim 8, said adhesive having been laminated.

10. A method of bonding comprising the step of assembling two silicone complexes with the silicone elastomer composition according to claim 1, an adhesive comprising the silicone elastomer according to claim 1, or a laminated adhesive strip comprising the silicone elastomer according to claim 1.

* * * * *

UNITED STATES PATENT AND TRADEMARK OFFICE
CERTIFICATE OF CORRECTION

PATENT NO. : 8,535,478 B2
APPLICATION NO. : 12/670868
DATED : September 17, 2013
INVENTOR(S) : Alain Pouchelon et al.

Page 1 of 1

It is certified that error appears in the above-identified patent and that said Letters Patent is hereby corrected as shown below:

In the Specification

Column 10, line 35, delete "M (OA," and insert --M (OJ)$_n$,--.

Column 10, line 44, delete "(VII.1)>10%," and insert --(VII.1)≥10%,--.

Column 10, line 45, delete "(VII.2)>10%," and insert --(VII.2)≥10%,--.

Column 10, line 46, delete "(VII.3)<80%," and insert --(VII.3)≤80%,--.

Column 14, line 19, delete "500 nm." and insert --500 μm.--.

Signed and Sealed this
Twelfth Day of November, 2013

Teresa Stanek Rea
*Deputy Director of the United States Patent and Trademark Office*